United States Patent [19]

Breese

[11] Patent Number: 5,588,682
[45] Date of Patent: Dec. 31, 1996

[54] ELECTRICALLY INSULATING GAS LINE SYSTEM

[75] Inventor: Dean E. Breese, Upper Arlington, Ohio

[73] Assignee: Schwler Manufacturing Company Inc., Hilliard, Ohio

[21] Appl. No.: 494,985

[22] Filed: Jun. 26, 1995

[51] Int. Cl.$^6$ .............................. F16L 55/00; F16L 19/02
[52] U.S. Cl. ................................................ 285/52; 285/55
[58] Field of Search .................................. 285/30, 52, 55

[56] References Cited

U.S. PATENT DOCUMENTS

| | | | |
|---|---|---|---|
| 299,206 | 5/1884 | Deavs | 285/52 |
| 3,115,354 | 12/1963 | Bowan et al. | 285/52 |
| 3,517,950 | 6/1970 | Anderson | 285/52 |
| 3,764,169 | 10/1973 | St. Clair | 285/52 |
| 3,807,773 | 4/1974 | Brune | 285/52 |
| 3,970,334 | 7/1976 | Campbell | 285/30 |
| 4,362,043 | 12/1982 | Hanson | 72/354 |
| 4,422,674 | 12/1983 | Stevernagle | 285/30 |
| 4,605,248 | 8/1986 | Goldsmith et al. | 285/52 |
| 5,124,192 | 6/1992 | Kim et al. | 428/215 |
| 5,447,340 | 9/1995 | Sands et al. | 285/52 |

Primary Examiner—Eric K. Nicholson
Attorney, Agent, or Firm—Ralph E. Jocke

[57] ABSTRACT

A system and method for electrically separating meters and pipes which carry combustible gases. The system includes at least one coupling (10). The coupling connects an electrically conductive conduit (12) to a gas meter (82) or other device. The coupling includes an electrically insulating layer (52) including a flange (61). A ring nut (74) engages a threaded portion (72) of a connecter to hold a resilient seal (14) in compressed relation between the flange and connector to provide a fluid tight connection. The coupling enables the flow of gas therethrough while electrically separating the conduit from the threaded connector. The system is easy to use, reliable, inexpensive and can be designed to be integral with a metal gas conducting conduit. Furthermore, the present invention provides improved performance, safety and long life due to the use of non-conductive material which impedes the flow of electricity along a gas line.

19 Claims, 6 Drawing Sheets

ELECTRICALLY INSULATING GAS LINE SYSTEM

BACKGROUND OF THE INVENTION

1. Field of the Invention

The present invention relates generally to connecting devices and systems for gas lines, particularly electrically conductive (i.e., metallic) natural gas lines. More specifically, the devices and systems of the present invention are not only easy to use, reliable and inexpensive, but they also provide improved safety due to the use of non-conductive (relative to metal) material which impedes the unwanted flow of electricity along the gas line.

2. Discussion of the Prior Art

Gas lines in general are well known. For purposes of this specification, "gas line" is intended to mean any conduit, pipe or similar-type enclosed passageway used to transfer gas under pressure. Gas lines are commonly used to transport natural gas to residential or commercial buildings, where the gas is then ignited under controlled conditions to provide energy, generally for heating.

A main gas line generally lies underground and is linked to nearby buildings by supply lines which typically remain underground until just before reaching a building. The supply line is typically connected to a gas meter adjacent to where the line enters the building. From the meter the gas line may extend through various shut-off valves, regulators and other devices for consuming the natural gas.

Supply lines are typically fabricated from metal. Generally speaking, they readily conduct electricity. Hence, electric charge (due to gas flow or other changes in electrostatic potential along the gas line) will tend to quickly move along the gas line from areas of high electrical potential to lower electrical potential. Sources of electricity on the gas line include static charge, improper or defective wiring, lightning, and the like.

Gas lines are generally grounded, particularly where the metal line is buried in the ground, and therefore, any electricity along the supply line will tend to move toward ground. However such electrical conduction along the supply line can be problematic, even dangerous. It is particularly undesirable to allow gas lines to serve as a ground for discharging electrical current. This is because the discharge of electricity into the earth excites micro-organisms in the soil. The micro-organisms will attack the gas line, resulting in accelerated corrosion and premature failure.

Insulating fittings such as swivels and unions have been produced that can be included in gas lines to provide an insulated connection between pipes that carry combustible gas. These insulating fittings provide threaded connections in the manner of conventional pipe fittings. As a result providing an insulating connection requires considerable plumbing work to incorporate in the gas line. The amount of plumbing work is even greater when the insulated connection is positioned adjacent to a gas meter. This is because the insulating fitting must be incorporated between other pipe fittings that connect the gas line inside the building to the gas meter. This requires considerable effort to cut and thread the pipes, connect the fittings and the meter and finally to test all the connections for leaks. This requires a great deal of skilled labor, and the cost is significant.

A need therefore exists for a relatively inexpensive, reliable insulating coupling system for metal gas lines and gas meters, which is not only easy to use and install, but also avoids unwanted electrical conduction.

SUMMARY OF THE INVENTION

Overview

The preferred coupling device and system of the present invention comprises an enclosed metal (or metalized) passageway suitable for transporting a pressurized gas. The passageway carries the gas to or from a gas meter. The coupling preferably comprises: 1) a conduit having a desired preformed configuration and having at one end portion a flange, and in a preferred embodiment, a diminished outer diameter on each side of the flange; 2) a separate insulating layer, which in one preferred embodiment is a molded nylon piece which overlies this flange end portion of the conduit, thereby electrically insulating the flange end portion; and 3) a threaded ring nut which can be moved over the conduit to engage the flange, and although the open portion of the nut passes beyond the flange, a face of the flange acts as a barrier which engages and prevents the ring nut from moving past the flange. A resilient seal is removably positioned on the face of the flange opposite to the face which engages the ring nut.

In use, a threaded nipple, spud or other mating connector of a gas meter having an outer thread is aligned with and pressed against the resilient seal carried on the flanged end of the coupling. The ring nut is then moved over the conduit toward the spud until the open, threaded portion of the ring nut which extends beyond the flange, can be turned to engage the internal threads of the ring nut with the threads of the spud. As the nut is screwed onto the spud, the nut compresses the seal, and holds the flange and spud together, thereby tightly connecting (and sealing) the conduit to the gas meter.

Each of the above described elements of the present invention will be described first, and thereafter, useful combinations and methods of use will be discussed.

Conduit

The most preferred conduit is a standard metallic gas line of any suitable diameter. The conduit can be of any length, but will typically be a pipe or tube segment of sufficient length so as to incorporate one or more bends. The conduit comprises a "coupling" end. The opposite end can also comprise a coupling or can comprise an outer thread, a weldable surface or any conventional or non-conventional configuration for making a connection to a gas line, gas receiving (or supplying) device or the like.

Concerning the coupling end of the conduit, this end portion preferably comprises a flange about 0.1 or more centimeters (preferably about 1–3 centimeters) from the end of conduit. The flange can be of any configuration, but preferably is an annular collar which extends at least a few millimeters (preferably about a centimeter or two) from the outer surface of the conduit. The flange can be welded onto the conduit or (more preferably) the flange can be formed as part of the conduit, i.e., cold formed, to provide a flange integral with the conduit.

The flange must have a diameter greater than the diameter of the small (unthreaded) aperture of the ring nut, but have a diameter less than the diameter of the large (threaded) opening of the ring nut. In this way, the ring nut can be mounted on the conduit, whereby the aperture is not able to pass beyond the flange, while the threaded opening of the ring nut is able to extend beyond the flange. Critical to the configuration and placement of the flange is that the flange be located close enough to the end of the conduit, that the threaded opening of the ring nut can engage complementary threads of a spud (or similar mating connector) of the gas meter which is pressed against the flanged end of the conduit. The flange should block the entire unthreaded opening of the ring nut, so that as the ring nut is threaded to the nipple or other mating connector, the engagement between the first side of the flange and ring nut provides sealing pressure to compress the resilient seal.

Similarly, when the coupling is connected to the spud or other mating connector on the gas meter, the threads of the ring nut cause the resilient seal to be compressed between the opposed side of the flange and the front face bounding the opening of the spud (or other mating connector). Once installed, the conductive conduit is electrically insulated from the conductive spud or other mating connector by means of the insulating layer covering the flange which is later described, while a gas tight seal is maintained through the coupling.

Between the flange and the longitudinal end of the conduit closest to the flange, the outer diameter of the conduit is preferably less than the outer diameter of the main body portion of the conduit. This end portion having a diminished outer diameter will hereafter be referred to as the "pilot" portion. The pilot portion provides support for the resilient seal and a guide for alignment with the spud. The pilot portion may be created by grinding, machining or the like, but is preferably integrally formed with the conduit. Similarly, the outer diameter of the conduit is also diminished (but to a lesser extent) on a portion of the conduit on the other longitudinal side of the flange. These surfaces have a diminished outer diameter to accommodate the insulating layer as discussed below.

Insulating Layer

The insulating layer is preferably a molded thermoplastic or elastomeric material having very low (relative to metal) electrical conductivity, which preferably can be permanently applied to the surface of the flanged end portion of the conduit. Preferably, the insulating layer is a unitary piece shaped to have a surface contour which is complementary to the surface contour of the flanged conduit end. In this way, the surface of the flanged end of the conduit is electrically insulated.

The insulating layer preferably covers the entire outer annular surface of the flanged end portion, including the perpendicular terminating edge of the conduit, the flange, the pilot portion and a neck portion of the conduit on a longitudinal side of the flange opposite to the pilot. The insulating layer can be further secured to the conduit by molding the insulating layer in place on the conduit.

The insulating layer is preferably an engineering plastic, such as high performance nylon or the like. Critical to the insulating layer is that it be sufficiently durable to withstand common stresses associated with gas couplings. Also, the insulating layer should extend over the entire outer surface of the coupling capable of contacting the spud or other mating connector with which the coupling would be in contact, since even a tiny amount of metal-to-metal contact between the conduit and the nipple or connector would be a sufficient conductive bridge to dramatically minimize (or even negate) the insulating value of the coupling.

The diminished outer diameters on each side of the flange accommodate the insulating layer. Preferably, the pilot portion comprises a sufficiently diminished diameter that the added thickness of the insulating material nevertheless provides a final combined outer diameter which is comparable or somewhat less than the outer diameter of the main body portion of the conduit on the opposed side of the flange. In this way, the complimentary configuration of the spud (having an inner bore and an outer thread) can be more easily inserted over the pilot portion of the conduit and pressed against the seal and flange. This enables a ring nut to be extended over the flange and engaged with the spud or mating connector. The spud can therefore have an inner bore diameter slightly greater than the outer diameter of the pilot portion, and still be placed substantially in overlying relationship with the flange.

Ring Nut

The preferred ring nut is preferably a concave member of conductive metal material having internal threads. At one end, the ring nut has a centered unthreaded opening or aperture slightly larger than the outer diameter of the conduit, this enables the ring nut to be movable on the conduit (but not past the flange). The unthreaded aperture in the ring nut is sized so that the ring nut is slightly radially disposed from the longitudinally extending neck portion of the insulating layer, which enables the ring nut to be readily turned. At the other longitudinal end of the ring nut, inner threads extend from an annular opening to adjacent the conduit flange. The inner threads preferably define a thread capable of engaging complementary threads of the spud or other mating connector of a gas meter.

The System

The system of the preferred embodiment of the invention comprises a conduit having a flanged end which is insulated by a layer of insulating material. Preferably the insulating material is molded nylon. In use, the insulated flanged end supporting a resilient seal is brought adjacent a spud (or similar mating connector) on a gas meter having an outer thread, and the ring nut is inserted onto the conduit. The ring nut extends from behind the flange, over the flange and against the complimentary threads of the spud. As the ring nut is turned, the threads on the ring nut and spud engage. As the ring nut is turned onto the spud, the flange and resilient seal are held in compressed relation between the ring nut and the spud, thereby creating a fluid tight connection.

In the area away from the flanged end, the conduit includes desired bends such as a ninety degree or a hundred and eighty degree bend configuration. This configuration is a predetermined standardized configuration for optimally connecting the gas meter to surrounding conduits. As a result the gas meter and surrounding piping may be installed as a single modular unit. This avoids the need to connect the gas meter through plumbing connections fabricated in the field. This avoids the cost of standard pipe fittings such as elbows and nipples that would normally be used, and also reduces the amount of skilled labor time that would otherwise be needed to make the connections.

The system has the advantage that the electrically insulating coupling is an integral part of the connection of the conduit to the gas meter. There is no need for a separate insulating coupling or union in the line. In addition, because the gas meter includes a spud for its gas inlet and outlet, it is feasible to provide electrically insulating connections at the inlet or outlet, or both.

DETAILED DESCRIPTION OF THE PREFERRED EMBODIMENT

Figure 1:
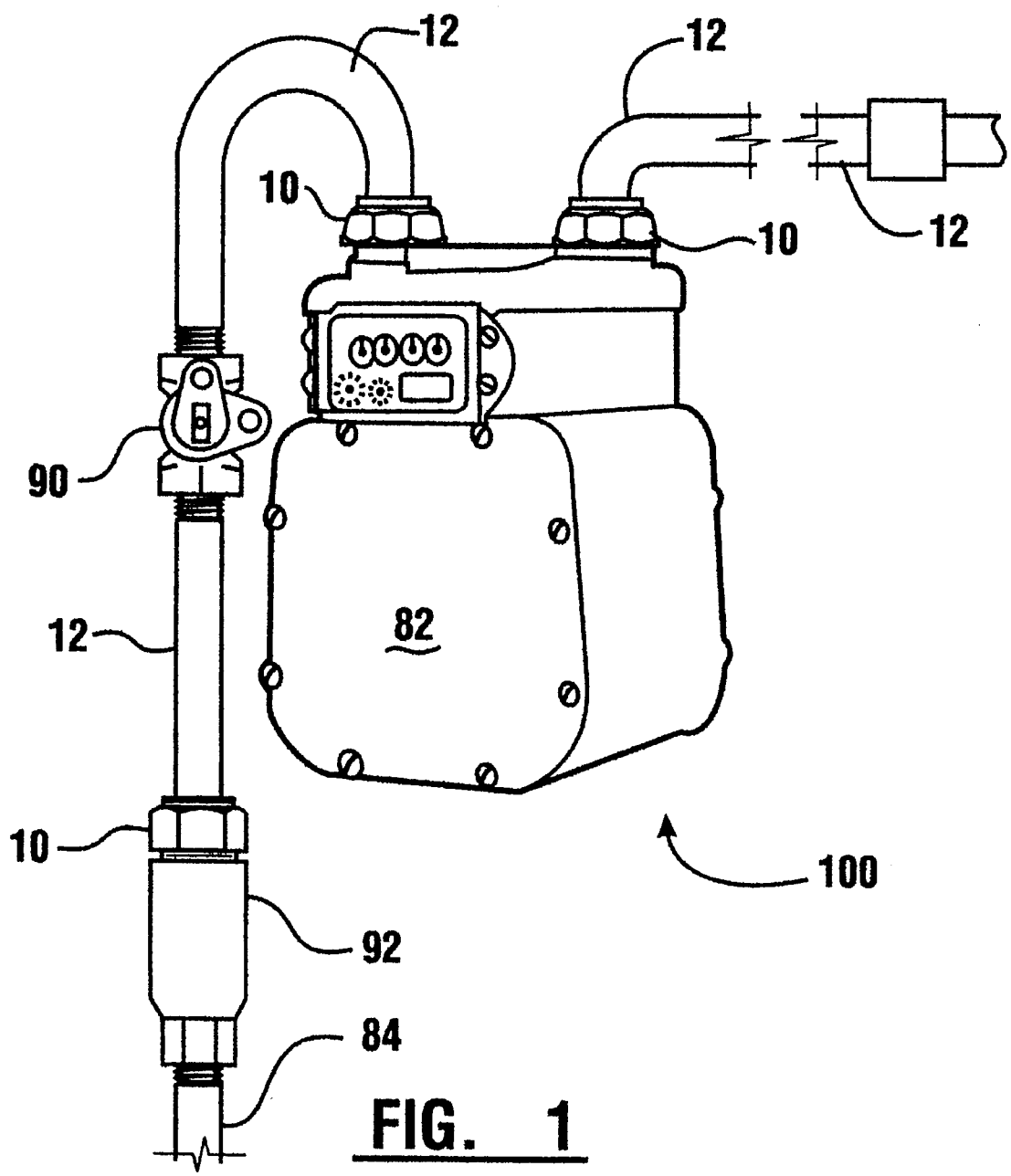
FIG. 1 is a perspective view of a system of insulating couplings and connectors in combination with a gas meter and other gas line related components, in accordance with the present invention.
Figure 3:
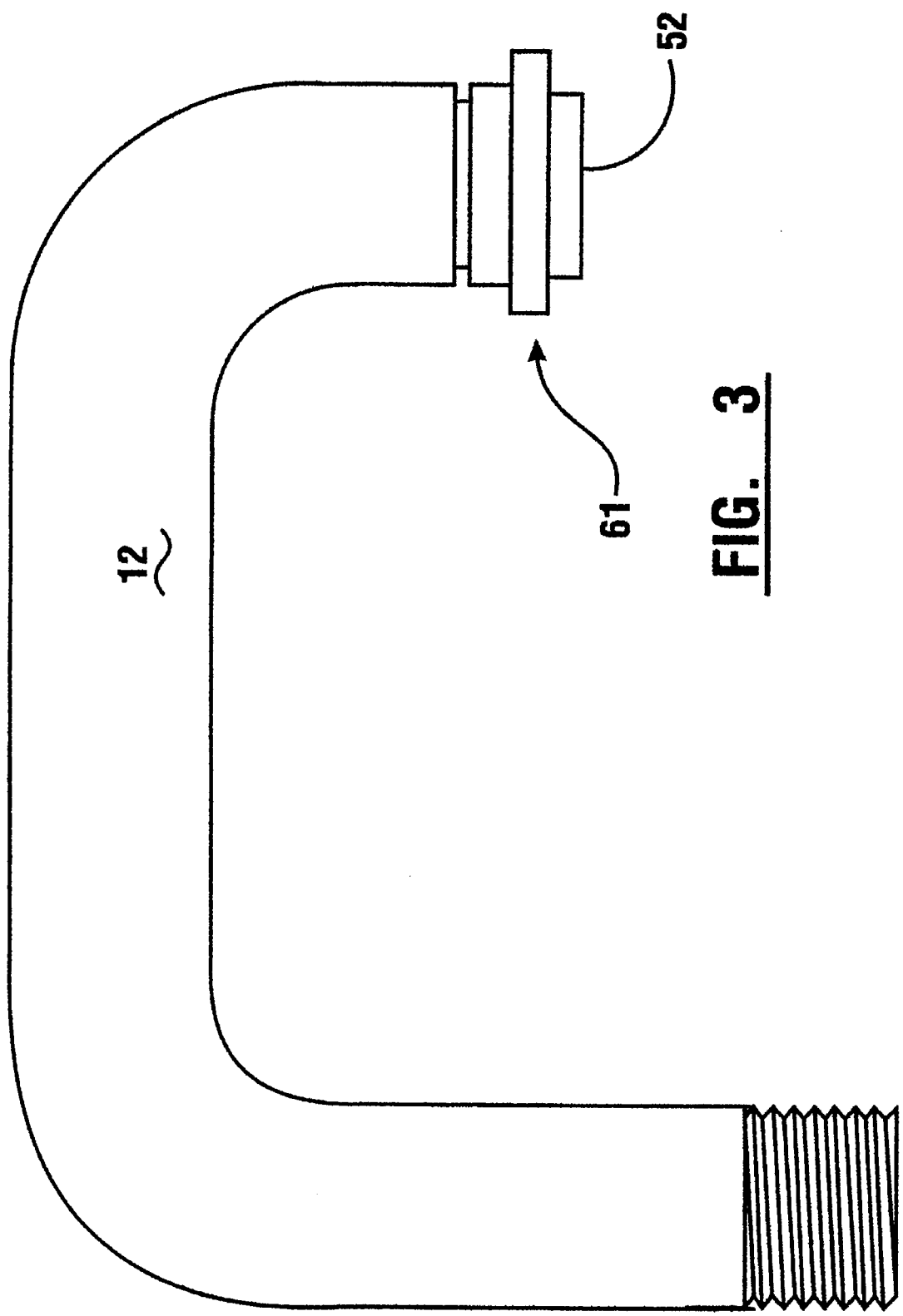
FIG. 3 is a side view of a coupling in accordance with the present invention having two 90 degree bends.
Figure 4:
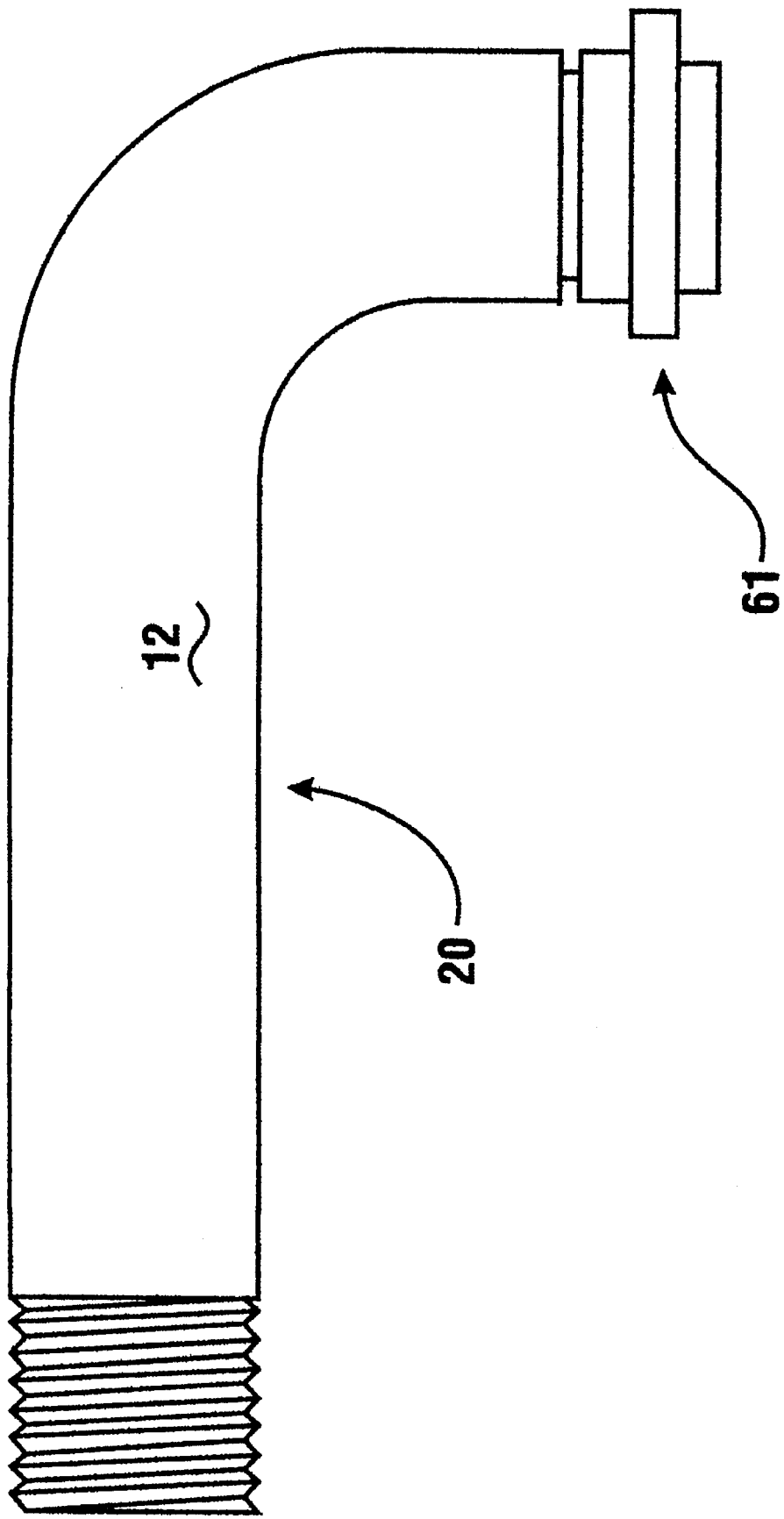
FIG. 4 is a side view of a conduit of a coupling having a single 90 degree bend.

A preferred system of the present invention is shown in FIG. 1 and is generally indicated 100. The system includes insulating couplings 10 each of which are shown in detail in FIG. 2. Each coupling includes an enclosed passageway or conduit 12 through which pressurized gas can be transported. In a preferred embodiment, the conduit is derived from a standard metallic gas pipe. The conduit can be of any length or configuration, such as the "U" shaped configuration of FIG. 3 or the "L" shaped configuration of shown generally at 20 in FIG. 4.

The conduit 12 is preferably derived from a standard API 5L gas pipe, which is a standard ¾ inch, 1 inch, 1¼ inch pipe size or the like. The pipe is cut to length and shaped or bent as required. Optimally the conduit is formed to a predetermined standardized configuration which allows the meter/coupling/conduits to be assembled into a modular configuration. This facilitates installation in a standard environment.

Figure 5:
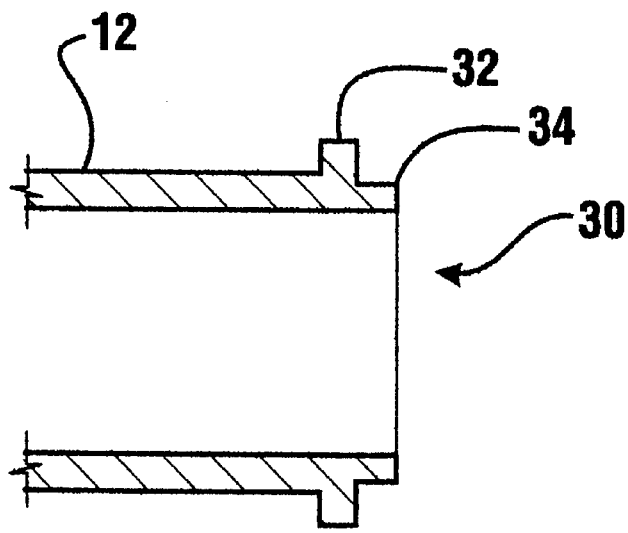
FIG. 5 is a cross sectional view of a precursor conduit component to a coupling conduit during fabrication in accordance with a method of the present invention.
Figure 8:
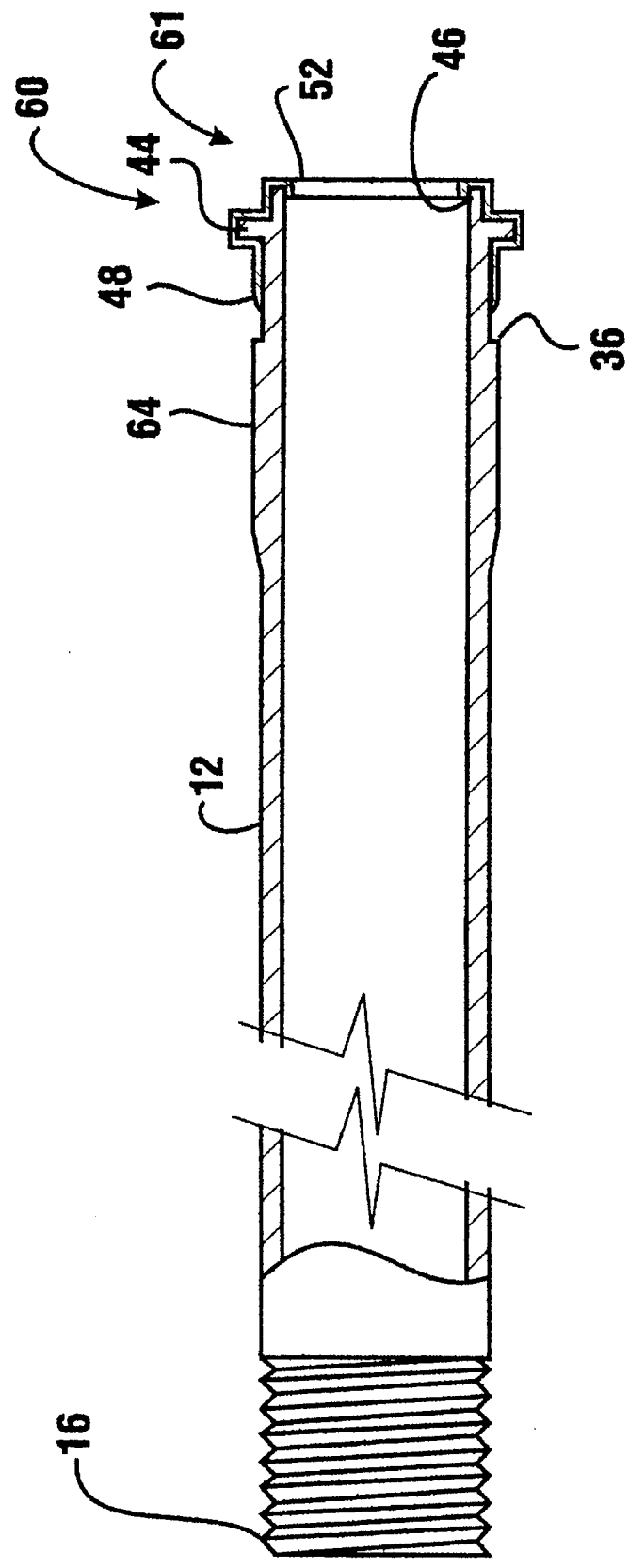
FIG. 8 is a cross sectional view of a straight coupling conduit component in combination with an insulating layer along the flanged portion of the conduit.

As illustrated in FIG. 5, at the intended coupling end 30 (or ends) of the pipe, a flange 32 and a pilot 34 are formed. The flange and pilot are preferably cold formed on the pipe. The cold forming process causes a slightly tapered, radially enlarged area 64 to be formed as best shown in FIG. 8.

Figure 6:
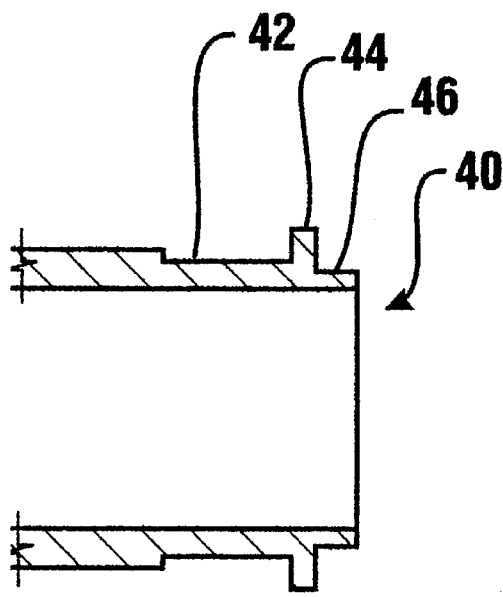
FIG. 6 is a cross sectional end view of a coupling conduit component in accordance with a method of the present invention.

As is illustrated by the precursor conduit profile generally indicated 40 in FIG. 6, the cold formed conduit end of FIG. 5 is then machined (or otherwise reshaped) to accept or accommodate a layer of insulating material along its entire outer surface. The reshaped flange is illustrated at 44, and the surface 42 of the conduit disposed from the reshaped flange is also reduced in outer diameter (while maintaining the inner diameter opening) as shown at 42. Finally, a reshaped pilot portion 46 is also configured to provide a final profile at the intended coupling end of the conduit for accommodating an insulating layer of material.

Figure 7:
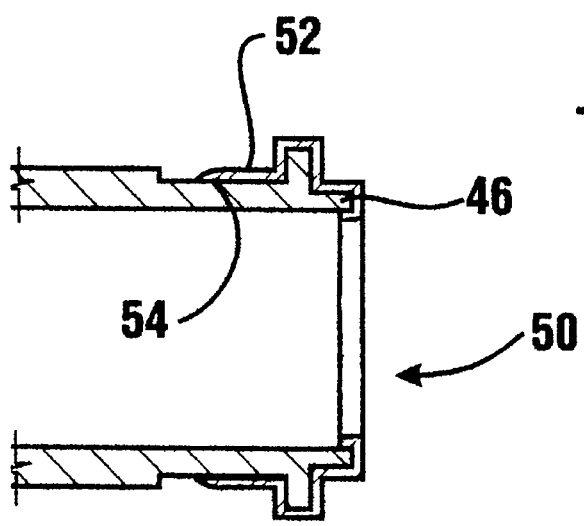
FIG. 7 is a cross sectional end view of the conduit portion of FIG. 4 in combination with an insulating layer which electrically insulates the end portion of the conduit.

FIG. 7 shows a final contour conduit 50 which comprises the conduit end 40 of FIG. 6 which includes an insulating layer 52. The insulating layer is preferably a self-supporting thermoplastic or elastomer, most preferably a molded engineering polymer, such as high performance nylon. Preferably, a bonding material 54 or other agent is applied between the insulating layer and the outer surface of the coupling to hold the layer and conduit attached in fixed relation. Prior to applying the insulating layer, the conduit is preferably cleaned, using a caustic bath or the like. The insulating layer can be applied in any conventional or non-conventional manner. Preferably the insulating ring is injection molded in place over the coupling end. Alternatively, a separate insulating member may be snapped into position on the coupling end. Other means for applying the insulating layer are certainly within the scope of the invention.

Regardless of the method of application, critical to the present invention is that the insulating layer have electrical conductivity at least an order of magnitude less than metal. Furthermore, the insulating layer should be sufficiently continuous to electrically insulate the conduit end along its outer surface, including the annular edge surface which defines the conduit opening. Preferably, the insulating layer extends a short distance longitudinally into the interior of the conduit to help hold the insulating layer thereto, but does not significantly block the inner passageway of the conduit. Therefore the insulating layer defines an aperture in substantial alignment with the aperture opening of the conduit.

The diameter of the pilot portion 46 is shaped to accommodate the annular molded insulating layer 52 as shown in FIG. 7. In this way, the outer diameter of the pilot and insulating layer combination is optimally sized for connection to a mating connector. The mating connector may have an inner diameter only slightly greater than the inner diameter of the conduit. In a preferred embodiment, the pilot portion/insulating layer can be inserted into the open bore of a spud or mating connector. A resilient annular seal 14 extends in sandwiched relation between the flange and the annular face of the spud (see FIG. 2). The annular seal has an inner diameter that is approximately that of the pilot portion which enables the seal to be held on the pilot portion prior to connection to the spud. This makes assembly easier. The outer diameter of the seal is similar to that of the flange. The annular face of the spud mating connector is abutted against the seal, whereby the spud contacts only the resilient seal which abuts the insulating layer. Therefore the spud is electrically insulated from the conduit.

FIG. 8 illustrates a final conduit 60 of the preferred embodiment present invention. The coupling conduit comprises a flange end 61 of the conduit 12 having the insulating layer 52 thereon which is permanently adhered to the conduit. Optionally, the opposite end of the conduit can also comprise a coupling or can comprise outer threads as shown at 16. The threads 16 can be designed to be compatible with a coupling, union or apparatus to which the conduit is connected. The conduit includes the enlarged area 64 produced during cold forming which serves to shield and protect the longitudinal end of the insulating layer 52. Enlarged area 64 includes a portion that is annularly tapered. The enlarged portion terminates at a radially inward extending step 36. An annular neck portion 48 of the insulating layer 52 is disposed longitudinally from said step in the direction of the flange.

Figure 2:
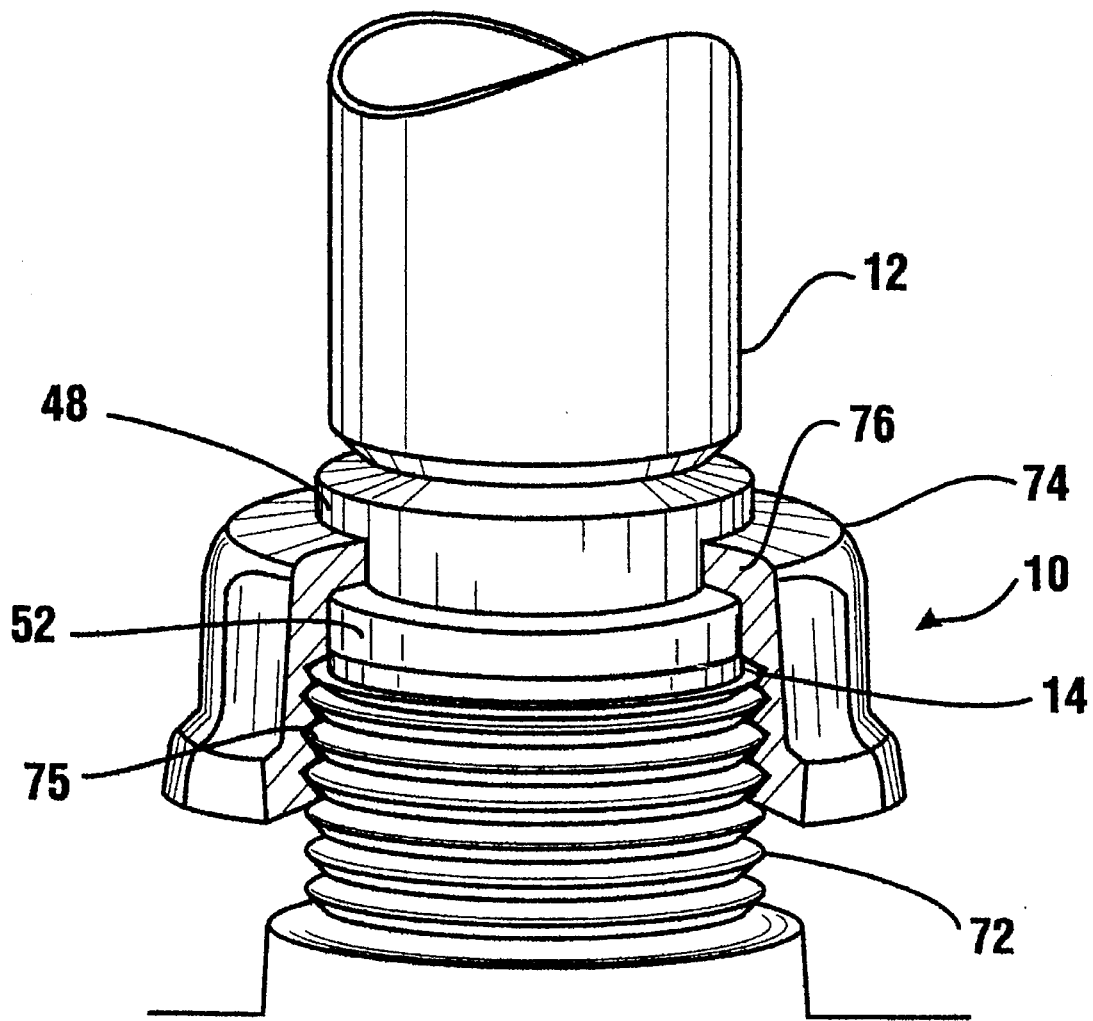
FIG. 2 is a perspective partially cut away view of the coupling of the present invention in combination with a spud of the gas meter or other connector.

FIG. 2 shows a cut away perspective view of the coupling 10 connected to an outer threaded portion 72 of a complimentary spud or mating connector. The coupling includes a ring nut 74 mounted on the conduit. The top portion of the ring nut has a radially inward extending lip portion 76 configured to engage a radially extending face on the insulating portion 52 overlying flange 32.

The ring nut extends beyond the flange and preferably also extends beyond the end of the conduit, and includes inner threads 75. The ring nut has an unthreaded aperture bounded by the lip portion 76 through which the neck portion 48 of the insulating layer extends. As the aperture in the ring nut is somewhat greater in diameter than the neck portion, the ring nut can be rotated relative to the coupling conduit to rotationally engage the outer threads of the spud and thereby provide a tight and secure connection. The ring nut holds the adjacent, radially extending annular face of the spud against seal 14 which is sandwiched between the spud face and first radially extending annular side of the insulated flange. The radially inward extending annular lip 76 of the ring nut abuts the opposed side of the flange and the insulating layer. While the ring nut is in electrical contact with the mating connector, it is separated from the coupling conduit by the seal and the insulating layer. The insulating layer is thereby situated between the metal conduit and metal connector, and the two metal pieces are thereby electrically insulated from one another.

As is illustrated generally by system 100 in FIG. 1, couplings 10 of the present invention are integral parts of a system for connecting a gas supply line 84 to a gas meter 82 and to other downstream components. Optimally the system incorporates the gas meter and inlet and outlet conduits 12 in a predetermined configuration which is a standardized envelope. The system may include a shut-off valve 90 and/or a filter 92. Electrically insulating couplings can be provided at one or both connections to the spuds on the meter and at the filter as desired.

The system of the present invention is particularly advantageous as it provides a standardized, single component configuration for a gas meter that also provides for an electrically insulating connection. The system allows the use of standard conduit configurations so that other lines can be brought to predetermined locations adjacent to where a gas meter will be connected. The meter and conduits can then be quickly connected to the adjacent lines. This avoids the need for a plumber to create custom connections between the other lines and the meter.

The present invention provides a substantially non-conductive connection without the use additional hardware. The invention is easy to use, reliable, inexpensive and provides added safety against unwanted conduction of electricity. Since the couplings of the present invention are substantially non-conducting relative to metal, there is no need for additional coupling hardware to insulate the line and gas meter from unwanted electrical conductivity.

Thus, the present invention achieves the above stated objectives, eliminates difficulties encountered in the use of the prior device and systems, solves problems and attains the desirable results described herein.

In the foregoing description certain terms have been used for brevity, clarity and understanding; however, no unnecessary limitations are to be implied therefrom because such terms are for descriptive purposes and are intended to be broadly construed. Moreover, the descriptions and illustrations given are by way of examples and the invention is not limited to the exact details shown or described.

Further in the following claims any feature of the invention which is recited as a means for performing a function is intended to encompass any means capable of performing the function and shall not be limited to the particular means shown herein or mere equivalents.

Having described the features, discoveries and principles of the invention, the manner in which it is made, constructed and operated, and the advantages and useful results attained; the new and useful structures, devices, elements, arrangements, parts combinations, systems, methods, equipment, operations and relationships are set forth in the appended claims.

I claim:

1. A system for electrically insulating conduits carrying combustible gas comprising:
   a gas meter including a threaded spud;
   an electrically conductive conduit portion, said conduit portion having an annular longitudinal end, wherein said end includes an opening, said opening adapted for flow of combustible gas therethrough, and further comprising an annular radially extending conduit flange portion, and an annular tapered portion longitudinally disposed from said conduit flange portion;
   a generally annular, continuous electrically insulating portion attached to said longitudinal end, said insulating portion extending in surrounding relation of said longitudinal end, said insulating portion including an annular radially outward extending insulating flange portion and a neck portion extending from said insulating flange portion in a longitudinal direction and away from said opening, wherein said conduit flange portion underlies said insulating flange portion both longitudinally and radially, and wherein said annular tapered portion of said conduit portion has a tapered portion diameter greater than a neck diameter of said neck portion, and wherein said tapered portion diameter of said tapered portion of said conduit terminates at a generally radially extending step, wherein said step is in close adjacent longitudinal relation with said neck portion; and
   a nut portion, said nut portion including a nut aperture, said neck portion extending through said nut aperture, said nut portion further including an annular, radially inward extending lip portion bounding said aperture, and an annular threaded portion longitudinally disposed from said lip portion, wherein said threaded portion is engageable with said spud, and said lip portion is engageable with said insulating flange portion.

2. The system according to claim 1 wherein the conduit portion terminates at an annular end face in surrounding relation of the opening, and wherein the insulating portion extends in the longitudinal away direction away from said flange portion and beyond said end face.

3. The system according to claim 2 wherein the insulating portion extends inside said conduit longitudinally away from said opening.

4. The system according to claim 1 wherein the conduit portion includes a reduced diameter portion, the insulating portion being attached to said reduced diameter portion.

5. The system according to claim 4 wherein the conduit portion includes an annular tapered portion longitudinally disposed from said insulating flange portion, said tapered portion having an outer diameter at least as large as said neck portion.

6. The system according to claim 1 wherein the conduit includes an annular pilot portion bounding said opening and extending longitudinally from said opening to said annular underlying conduit flange portion.

7. A system for electrically insulating conduits carrying combustible gas comprising:
   a gas meter including a threaded spud, said spud having a spud opening bounded by a generally radially extending annular spud face;
   an electrically conductive conduit portion, said conduit portion having an annular longitudinal end, wherein said end includes an opening, said opening bounded by a generally radially extending opening end face, said opening adapted for flow of combustible gas therethrough, and wherein said conduit portion further comprises an annular radially extending conduit flange portion;
   a generally annular, continuous electrically insulating portion attached to said longitudinal end, said insulating portion extending in surrounding relation of said longitudinal end, both inwardly and outwardly of said opening and across said opening end face, said insulating portion including an annular radially outward extending insulating flange portion and a neck portion extending from said insulating flange portion in a longitudinal direction and away from said opening, and wherein said conduit flange portion underlies said insulating flange portion radially and also in the longitudinal direction and in an opposed longitudinal direction, and wherein said insulating portion extends in said spud opening, and wherein said insulating flange portion is disposed from said spud face by a generally annular space, and wherein an annular resilient seal fills said annular space; and a nut portion, wherein said nut portion includes a nut aperture, said neck portion extending through said nut aperture, said nut portion further including an annular, radially inward extending lip portion bounding said aperture, and an annular threaded portion longitudinally disposed from said lip portion, wherein said threaded portion is in engagement with said spud and said lip portion of said nut is in engagement with said insulating flange portion.

8. A method for insulating conduits for carrying combustible gas comprising the steps of:

cold forming a flange, a pilot portion and an enlarged annular tapered portion having a tapered portion diameter and bounded by a generally radially extending step, on a metal conduit pipe;

applying a continuous layer of electrically insulating material over the flange and pilot portion, and applying said layer on an annular neck portion longitudinally disposed from said flange portion, wherein said layer is applied longitudinally on said conduit in close adjacent relation to said radially extending step, and wherein said layer is applied on said neck portion such that a diameter of said neck portion is less than said tapered portion diameter;

attaching a nut portion on said pipe, said nut portion having an aperture at a first longitudinal end, and a threaded portion at an opposed longitudinal end, said neck portion extending through said aperture; and engaging said threaded portion of said nut to a spud of a gas carrying device.

9. A method for insulating conduits for carrying combustible gas comprising the steps of:

cold forming a flange and a pilot portion on a metal conduit pipe wherein said pipe has an opening to said interior area and wherein said opening is bounded by a generally radially extending end face, and wherein said pilot portion is disposed longitudinally between said end face and said flange;

applying a continuous layer of electrically insulating material over the flange, said pilot portion, said end face and longitudinally into the interior area of said pipe, wherein said layer is applied so that said flange underlies said layer both in a radial direction and in a first longitudinal direction and in an opposed longitudinal direction from said flange;

placing a resilient seal in supported relation on said pilot portion, wherein said resilient seal fills an annular space extending radially outward of said pilot portion and to a maximum diameter of said layer overlying said flange;

attaching a nut portion on said pipe, said nut portion having an aperture at a first longitudinal end, and a threaded portion at an opposed longitudinal end, said pipe extending through said aperture; and extending said pilot portion in a spud opening of a spud, and engaging said resilient seal with an annular spud face extending generally radially outwardly of said spud opening, and engaging the threaded portion of said nut to an outer annularly threaded surface of said spud.

10. The system according to claim 7 wherein the conduit portion includes an annular tapered portion, said tapered portion having a tapered portion diameter larger than a diameter of said neck portion, said tapered portion terminating at a generally radially extending step, said step closely adjacent said neck portion.

11. The system according to claim 10 wherein the conduit portion includes an annular thick wall portion extending longitudinally between said step and said underlying conduit flange portion.

12. The system according to claim 1 wherein the neck portion includes an annular outward extending neck face longitudinally disposed from said radially extending step.

13. The system according to claim 12 wherein said neck face is tapered radially outwardly with increasing distance longitudinally away from said step.

14. The system according to claim 1 and further comprising a second spud on said gas meter, and a second conduit and nut portion in engagement with said second spud.

15. The system according to claim 1 and wherein said spud includes an annular, radially extending spud face, and further comprising an annular resilient seal extending longitudinally between said insulating flange portion and said spud face.

16. A method for insulating conduits for carrying combustible gas comprising the steps of:

cold forming a flange and a pilot portion on a metal conduit pipe;

bending said conduit pipe to a desired curved configuration;

applying a layer of electrically insulating material over the flange and pilot portion;

attaching a nut portion on said pipe, said nut portion having an aperture at a first longitudinal end, and a threaded portion at an opposed longitudinal end, said pipe extending through said aperture; and engaging said threaded portion of said nut to a spud of a gas carrying device.

17. A method in accordance with claim 16 further comprising the step of:

machining the flange and pilot to a shape which will accommodate the insulating layer of material, and wherein the insulating layer of material is applied by molding said layer on said pipe.

18. A method in accordance with claim 16 further comprising the step of:

cleaning the conduit pipe in a caustic bath prior to applying the insulating material to the conduit.

19. A method in accordance with claim 9 further comprising the step of bending the conduit pipe to a desired configuration.

* * * * *

UNITED STATES PATENT AND TRADEMARK OFFICE
CERTIFICATE OF CORRECTION

PATENT NO. : 5,588,682
DATED : December 31, 1996
INVENTOR(S) : Dean E. Breese It is certified that error appears in the above-identified patent and that said Letters Patent is hereby corrected as shown below:

In the Abstract page, the name of the Assignee is changed to

-- Schuler Manufacturing Company Inc. --

Signed and Sealed this

Twenty-fifth Day of March, 1997

*Attest:*

BRUCE LEHMAN

*Attesting Officer*     *Commissioner of Patents and Trademarks*